Patented Oct. 16, 1951

2,571,326

UNITED STATES PATENT OFFICE 2,571,326

AQUEOUS SOLUTIONS OF RIBOFLAVIN

Margaret Rose Zentner, Newark, N. J., assignor to Hoffmann-La Roche Inc., Nutley, N. J., a corporation of New Jersey No Drawing. Application January 31, 1950,
Serial No. 141,583

2 Claims. (Cl. 167—81)

The present invention relates to aqueous solutions of riboflavin alone and riboflavin in multivitamin compositions.

The slight solubility of riboflavin in water and other solvents suitable for pharmaceutical preparations is well known; its solubility in water being only about 0.013%, whereas therapeutic preparations in the form of solutions ordinarily require concentrations of riboflavin which are many times higher than the amount of this vitamin normally soluble in water.

Many solubilizers for riboflavin have been proposed, including gallic acid and salts of gallic acid. However, when gallic acid is employed to solubilize vitamin $B_2$ in vitamin preparations containing niacinamide and where the pH of the solution is about 5 or less, there results an undesirable coprecipitate of the gallic acid with the niacinamide. Gentisic acid ethanolamide has also been proposed as a solubilizer for vitamin $B_2$. However, its use in vitamin solutions including vitamin A has been found to have a deleterious effect upon the vitamin A potency and also upon the physical stability of the solution.

According to the present invention, it has been found that N-($\beta$-hydroxyethyl)-3,4,5-trihydroxybenzoic acid amide which may be also designated as N-($\beta$-hydroxyethyl)-gallic acid amide, can be employed to solubilize riboflavin without forming a coprecipitate with niacinamide and without deleteriously affecting vitamin A potency or the stability of vitamin A containing solutions. The N-($\beta$-hydroxyethyl)-gallic acid amide exerts a rather strong solubilizing action on riboflavin, thereby permitting use of a relatively small amount of this compound to maintain therapeutic amounts of riboflavin in solution.

The characteristic of the N-($\beta$-hydroxyethyl)-gallic acid amide not to form a precipitate with niacinamide is also advantageous in preparing riboflavin solutions containing other B vitamins, such as vitamin $B_1$. It is known that vitamin $B_1$ is stable in the form of its hydrochloride in strongly acid solution. In a weekly acid solution, however, it decomposes, breaking down and losing its activity at pH of 5-6. In neutral and alkaline solutions it is unstable. Thus if riboflavin is to be administered at the same time as vitamin $B_1$ hydrochloride a pH of below 5 is necessary to maintain stability of the vitamin $B_1$. Accordingly, the use of gallic acid as a solubilizer for riboflavin in such a solution which also contains niacinamide would be undesirable in view of the fact that the gallic acid forms a precipitate with the niacinamide at such a pH. On the other hand, N-($\beta$-hydroxyethyl)-gallic acid amide not only meets the requirements on the acid side with respect to the stability of vitamin $B_1$ but also does not form a coprecipitate with the niacinamide.

In general, the manufacture of the aqueous solutions of riboflavin involves preparing a water solution of the N-($\beta$-hydroxyethyl)-gallic acid amide followed by the addition of riboflavin, usually while warming. Additional vitamins such as vitamin $B_1$, vitamin $B_6$, niacinamide, pantothenic acid, panthenol, and vitamin C may be added, if desired. The solution may be diluted with water to the desired volume and the pH adjusted to the desired value. The preparation of the riboflavin solutions may be carried out in an inert atmosphere as a precautionary measure to avoid decomposition of any of the ingredients. A suitable inert gas such as carbon dioxide or nitrogen may be utilized for this purpose.

The solutions of riboflavin produced with N-($\beta$-hydroxyethyl)-gallic acid amide have the additional advantage that they can be compounded with solutions of vitamin A in a suitable solubilizing agent for vitamin A such as, sorbitan monooleate (ethyleneoxide)$_{20}$ to give composite clear aqueous solutions. In such solutions, the use of N-($\beta$-hydroxyethyl)- gallic acid amide is particularly advantageous since it has no deleterious action on either the vitamin A contained in the solution or on the physical stability of the solution itself. The vitamin A employed may be in the form of the vitamin A alcohol or the esters thereof, such as vitamin A acetate or vitamin A palmitate, or the like.

N-($\beta$-hydroxyethyl)-gallic acid amide or N-($\beta$-hydroxyethyl)-3,4,5-trihydroxybenzoic acid amide is a new compound and its preparation is described in detail in the application of Margaret Rose Zentner and Gerhard Julius Haas, Ser. No. 141,582 filed of even date herewith. In general, as described in that application, the compound can be prepared by reacting the methyl ester of gallic acid with monoethanolamine in excess as, for example, in the following manner:

50 grams of methyl gallate and 40.8 grams of monoethanolamine were heated together at 115–120° C. for 8 hours. The solid product which formed was dissolved in 1,300 cc. of boiling water and the solution was adjusted to pH 3–5 with 35 cc. of 36% hydrochloric acid. 2.5 grams of activated charcoal were added and after maintaining the temperature at the boiling point for 10 minutes, the solution was filtered and concentrated to 310 cc. in vacuo. Upon cooling the concentrate and allowing it to stand for 16 hours at about 4° C., crystals of N-(β-hydroxyethyl)-3,4,5-trihydroxybenzoic acid amide, M. P. 217.5-218.8° C., were obtained. The product was recrystallized once by dissolving the crystals in boiling water and cooling the resulting solution. Upon further purification by refluxing the recrystallized material for one hour with acetone, there was obtained N-(β-hydroxyethyl)-3,4,5-trihydroxybenzoic acid amide, M. P. 219-220.5° C.

The following examples will serve to illustrate the invention.

*Example 1*

1.5 grams of N-(β-hydroxyethyl)-gallic acid amide were dissolved in 96 cc. of water at 40° C. and there was added 0.15 grams of riboflavin. The resulting preparation was made up to 100 cc. by adding sufficient water and then shaken for 35 hours at room temperature and filtered. A clear solution containing 107 mg. of riboflavin in solution was obtained. The pH of the solution was 5.2.

*Example 2*

0.185 grams of riboflavin were dissolved by heating in the presence of carbon dioxide at 95° C. for 40 minutes in a solution made up of 40 cc. of water and 1.0 gram of N-(β-hydroxyethyl)-gallic acid amide. Then 1.75 grams of niacinamide were added and the solution was made up to 100 cc. with water. The pH of this solution was 5.42 and was adjusted with dilute sulfuric acid to pH 4.2. The resulting solution was filtered. One sample of the filtered solution was stored at room temperature and an identical sample stored at about 4° C., each for a period of 33 days. The sample stored at room temperature contained 0.169% of riboflavin, while that stored at 4° C. contained 0.167% of riboflavin, the pH of the solutions being 4.3 and 4.5, respectively. The stored sample solutions were clear and showed no precipitate.

*Example 3*

1.8 grams of N-(β-hydroxyethyl)-gallic acid amide were dissolved at 90-95° C. in 60 cc. of distilled water. To the solution of 0.11 grams of riboflavin were added while warming to dissolve the riboflavin. The solution was kept for 10 minutes at 90-95° C., then cooled to room temperature. A separate solution was prepared by warming on a water bath 0.495 grams of vitamin A palmitate having a potency of 1,010,000 U. S. P. units per gram, 10 grams of sorbitan monooleate (ethyleneoxide)$_{20}$ and 10 cc. of water. The solution thus prepared was added to the riboflavin solution with mixing. A clear solution was obtained having a pH of 6.32. The pH was adjusted to 4.2 with dilute sulfuric acid and the volume brought up to 100 cc. by adding sufficient distilled water. The solution remained clear.

*Example 4*

1.8 grams of N-(β-hydroxyethyl)-gallic acid amide were dissolved at 90-95° C. in 60 cc. of distilled water. To the solution 0.11 grams of riboflavin were added while warming to dissolve the riboflavin. The solution was kept for 10 minutes at 90-95° C., then cooled to room temperature and 1.0 gram of niacinamide added. A separate solution was prepared by warming on a water bath 0.495 grams of vitamin A palmitate having a potency of 1,010,000 U. S. P. units per gram, 10 grams of sorbitan monooleate (ethyleneoxide)$_{20}$ and 10 cc. of water. The solution thus prepared was added to the riboflavin solution with mixing. A clear solution was obtained having a pH of 6.3. The pH was adjusted to 4.2 with dilute sulfuric acid and the volume brought up to 100 cc. by adding sufficient distilled water. The solution remained clear.

*Example 5*

1.8 grams of N-(β-hydroxyethyl)-gallic acid amide were dissolved at 90-95° C. in 60 cc. of distilled water. To the solution 0.11 grams of riboflavin were added while warming to dissolve the riboflavin. The solution was kept for 10 minutes at 90-05° C., then cooled to room temperature and 1.0 gram of niacinamide, 5 grams of vitamin C, and 0.1 gram of vitamin B$_1$ were added. A separate solution was prepared by warming on a water bath 0.495 grams of vitamin A palmitate having a potency of 1,010,000 U. S. P. units per gram, 0.1 gram of irradiated ergosterol having a potency of 1,000,000 U. S. P. vitamin D units per gram, 10 grams of sorbitan monooleate (ethylene)$_{20}$ and 10 cc. of water. The solution thus prepared was added to the riboflavin solution with mixing. A clear solution was obtained having a pH of 3.32. The pH was adjusted to 4.2 with dilute sodium hydroxide and the volume brought up to 100 cc. by adding sufficient distilled water. The solution remained clear.

I claim:

1. An aqueous solution containing riboflavin in a concentration higher than 0.013% and N-(β-hydroxyethyl)-gallic acid amide as a riboflavin solubilizer.

2. The composition of claim 1 in which the pH is less than 5.

MARGARET ROSE ZENTNER.

REFERENCES CITED

The following references are of record in the file of this patent:

UNITED STATES PATENTS

| Number | Name | Date |
|---|---|---|
| 2,407,624 | Bird | Sept. 17, 1946 |
| 2,463,461 | Hoffer | Mar. 1, 1949 |

FOREIGN PATENTS

| Number | Country | Date |
|---|---|---|
| 485,569 | Great Britain | Mar. 17, 1938 |

Certificate of Correction

Patent No. 2,571,326

October 16, 1951

MARGARET ROSE ZENTNER

It is hereby certified that error appears in the printed specification of the above numbered patent requiring correction as follows:

Column 1, line 44, for "weekly" read *weakly*; column 4, line 27, for "90–05°" read *90–95°*; lines 35 and 36, for "(ethylene)$_{20}$" read *(ethyleneoxide)*$_{20}$; line 62, list of references cited, under FOREIGN PATENTS, for "Mar. 17" read *May 17*;

and that the said Letters Patent should be read as corrected above, so that the same may conform to the record of the case in the Patent Office.

Signed and sealed this 5th day of February, A. D. 1952.

[SEAL]

THOMAS F. MURPHY,
*Assistant Commissioner of Patents.*